United States Patent
Xi

(10) Patent No.: US 11,212,742 B2
(45) Date of Patent: Dec. 28, 2021

(54) UPF SELECTION METHOD AND DEVICE

(71) Applicant: DATANG MOBILE COMMUNICATIONS EQUIPMENT CO., LTD, Beijing (CN)

(72) Inventor: Jiande Xi, Beijing (CN)

(73) Assignee: DATANG MOBILE COMMUNICATIONS EQUIPMENT CO., LTD, Beijing (CN)

(*) Notice: Subject to any disclaimer, the term of this patent is extended or adjusted under 35 U.S.C. 154(b) by 0 days.

(21) Appl. No.: 16/968,882

(22) PCT Filed: Jan. 9, 2019

(86) PCT No.: PCT/CN2019/070979
§ 371 (c)(1),
(2) Date: Aug. 11, 2020

(87) PCT Pub. No.: WO2019/154001
PCT Pub. Date: Aug. 15, 2019

(65) Prior Publication Data
US 2021/0014778 A1    Jan. 14, 2021

(30) Foreign Application Priority Data
Feb. 11, 2018    (CN) .......................... 201810142514.9

(51) Int. Cl.
*H04W 48/18*    (2009.01)
*H04W 76/12*    (2018.01)
(Continued)

(52) U.S. Cl.
CPC .............. *H04W 48/18* (2013.01); *H04W 8/26* (2013.01); *H04W 48/16* (2013.01); *H04W 76/11* (2018.02); *H04W 76/12* (2018.02)

(58) Field of Classification Search
CPC ....... H04W 48/16; H04W 48/18; H04W 8/26; H04W 76/11; H04W 76/12
(Continued)

(56) References Cited

U.S. PATENT DOCUMENTS

2019/0075431 A1 *    3/2019    Albasheir ............. H04L 67/101

FOREIGN PATENT DOCUMENTS

| CN | 101052209 A | 10/2007 |
|---|---|---|
| CN | 106851856 A | 6/2017 |

(Continued)

OTHER PUBLICATIONS

"3rd Generation Partnership Project; Technical Specification Group Services and System Aspects; Procedures for the 5G System; Stage 2 (Release 15)", 3GPP Standard; Technical Specification; 3GPP TS 23.502, 3rd Generation Partnership Project (3GPP), Mobile Competence Centre; 650, Route Des Lucioles; F-06921 Sophia-Antipolis Cedex; France, vol. SA WG2, No. V15.0.0, Dec. 22, 2017 (Dec. 22, 2017), pp. 1-258, XP051392102, [retrieved on Dec. 22, 2017] section 4.9.1.3.2.

(Continued)

*Primary Examiner* — Joel Ajayi
(74) *Attorney, Agent, or Firm* — Bayramoglu Law Offices LLC

(57) ABSTRACT

A UPF element selection method includes: judging, by a SMF element, whether a target RAN node is connected to a current UPF element; if not, determining that a user terminal is moved out of a current UPF service area; sending, by the SMF element, a resource acquisition request to a NRF, a resource response message including a UPF list, wherein the UPF list includes a UPF address, and a service application ID list supported by the UPF element; receiving, by the SMF element, the resource response message fed back by the NRF; judging, by the SMF element, whether a current service application ID carried by the user terminal belongs to the service application ID list supported by the UPF element; and if yes, accessing the user terminal to a target UPF element. A UPF element selection device using the UPF element selection method is provided.

7 Claims, 4 Drawing Sheets

(51) Int. Cl.
*H04W 76/11* (2018.01)
*H04W 8/26* (2009.01)
*H04W 48/16* (2009.01)

(58) Field of Classification Search
USPC .................................................. 455/414.1
See application file for complete search history.

(56) References Cited

FOREIGN PATENT DOCUMENTS

| CN | 107018542 A | 8/2017 |
|---|---|---|
| EP | 3496465 A1 | 6/2019 |

OTHER PUBLICATIONS

Anonymous:"3rd Generation Partnership Project; Technical Specification Group Services and System Aspects System Architecture for the 5G System; Stage 2 (Release 15)", 3GPP Standard; Technical Specification; 3GPP TS 23.501, 3rd Generation Partnership Project (3GPP), Mobile Competence Centre; 650, Route Des Lucioles; F-06921 Sophia-Antipolis Cedex; France, vol. SA WG2, No. V15.0.0, Dec. 22, 2017 (Dec. 22, 2017), pp. 1-181, XP051392101, [retrieved on Dec. 22, 2017] sections 5.6.7, 6.3.3.
LG Electronics. "TS 23.502: Clarification on LADN Location Reporting" SA WG2 Meeting #124 S2-179340, Dec. 1, 2017 (Dec. 1, 2017), section 4.9.1.3.2.
Nokia et al."NRF for UPF Discovery" SA WG2 Meeting #124 S2-179325, Dec. 1, 2017 (Dec. 1, 2017), sections 4.17.X.2 and 5.2.7.2.

* cited by examiner

UPF SELECTION METHOD AND DEVICE

CROSS REFERENCE TO THE RELATED APPLICATIONS

This application is the national phase entry of International Application No. PCT/CN2019/070979, filed on Jan. 9, 2019, which is based upon and claims priority to Chinese Patent Application No. 201810142514.9, filed on Feb. 11, 2018, the entire contents of which are incorporated herein by reference.

TECHNICAL FIELD

The disclosure relates to the field of communication technologies, and more particularly, to a UPF selection method and a UPF selection device.

BACKGROUND

An entity UPF (User Plane Function) element in a 5G system is deployed to a position close to an access network to shorten a time delay of some specific services and improve services experience of a user. The deployment of the UPF element close to the access network may be limited to a certain small area. When a user who moves in a small scope moves in this area, the network can satisfy experience of the user. However, some users continuously move in a large area, and it is inevitable for some users to move from one UPF element service area to the other UPF element service area, which leads to a UPF element reselection.

For example, in the case that a user who drives on a highway is using a low-delay Internet of Vehicles service, a UPF element related to the Internet of Vehicles service deployed at the edge of the access network; however, there is a long distance from a city A to a city B for the user, and multiple edge-deployed UPF elements are usually deployed along the highway line. A service identification list supported by the UPF element needs to be known when a SMF (Session Management Function) element selects the UPF element in order to satisfy a continuity of the Internet of Vehicles service of the user. Using parameters such as a DNN (Data Network Name) determined by a current protocol to select the UPF element cannot be well suitable to this scenario, because the DNN has no direct correlation with the specific services, some edge-deployed UPF elements only serve some specific services, while the DNN cannot represent all the services. The UPF element not supporting the Internet of Vehicles service may be selected through DNN parameters during movement of a UE, while the Internet of Vehicles scenario requires accurate selection on the UPF element.

The user plane function UPF of the low-delay service determined by a 5G system standard can be deployed to a position close to the edge of the access network, and the UPF element is selected by the SMF element.

The 5G standard currently has the following two solutions for this.

First solution: as shown in FIG. 1, there are two UPF elements under one PDU Session in the 5G standard, wherein one UPF element is close to a RAN (Radio Access Network) to distribute the low-delay services, and the other UPF element is located at a core network to transmit other services with relaxed delay. In the solution, the two UPF elements are selected and controlled by the SMF element. Meanwhile, the UPF element at the core network servers as an anchor point of an IP (Internet Protocol Address). The UPF elements can be selected by the SMF element through associating the DNN with the low-delay services.

Second solution: as shown in FIG. 2, there is one UPF element under the PDU Session in the 5G standard, and the UPF element is deployed to a position close to the RAN for low-delay distributed services to distribute the low-delay services. This UPF service area is generally limited by the RAN and is a small area. Meanwhile, the UPF element serves as the anchor point of the IP. The UPF element can be selected by the SMF element through associating the DNN with the low-delay services.

However, the above two solutions have the following defects.

According to the first solution, the anchor point of the IP is located in the UPF element at the core network, and the UPF element deployed close to the access network may either distribute ultra-low-delay services, or distribute services across the UPF elements, which is suitable for a UE (User Equipment) moving in a large scope. However, when there are differences among the services supported by the edge-deployed UPF element, it is inaccurate to select the UPF element through the DNN. Since the services supported by the deployed UPF element are often different, the Internet of Vehicles service needs to be deployed in some areas, while an industrial control service needs to be deployed in some areas. Therefore, using the DNN to distinguish the services cannot meet service development requirements.

According to the second solution, the anchor point of the IP is located in the edge-deployed UPF element, which has a small coverage scope due to the limitation of an associated RAN coverage area, and can a distribution requirements of the ultra-low-delay services, but is not suitable for the UE moving in a large scope. If the UE is moved out of the coverage area of the UPF element, the service is interrupted. If the UE needs to continue the same service, the SMF element needs to reselect the UPF element after the UE is accessed to the network. If the services are distinguished using the DNN, a large amount of DNNs are needed, which is actually unpractical.

Therefore, there is an inaccuracy in selecting the UPF element using parameters such as the DNN.

SUMMARY

In order to solve the above problem of an inaccuracy in selecting a UPF element using parameters such as a DNN, embodiments of the disclosure provide a UPF element selection method and a corresponding UPF element selection device.

In order to solve the above problem, the embodiments of the disclosure disclose a UPF element selection method, including:

judging, by a SMF element, whether a target RAN node is connected to a current UPF element;

if not, determining that a user terminal is moved out of a current UPF service area;

sending, by the SMF element, a resource acquisition request to a NRF, a resource response message including a UPF list, wherein the UPF list includes a UPF address, and a service application ID list supported by the UPF element;

receiving, by the SMF element, the resource response message fed back by the NRF;

judging, by the SMF element, whether a current service application ID carried by the user terminal belongs to the service application ID list supported by the UPF element; and if yes, accessing the user terminal to a target UPF element.

Preferably, the resource acquisition request includes a network slice identification S-NSSAI, an access technology type being used by a UE, the service application ID, and UE location information.

Preferably, the UPF address includes an IP address and a tunnel identification of the target UPF element.

Accordingly, the embodiments of the disclosure disclose a UPF element selection device, including:

a node connection judging module located in a SMF element and configured to judge whether a target RAN node is connected to a current UPF element;

a node connection determining module located in the SMF element and configured to determine that a user terminal is moved out of a current UPF service area;

a sending module located in the SMF element and configured to send a resource acquisition request to a NRF, a resource response message including a UPF list, wherein the UPF list includes a UPF address, and a service application ID list supported by the UPF element;

a receiving module located in the SMF element and configured to receive the resource response message fed back by the NRF;

a service application ID judging sub-module located in the SMF element and configured to judge whether a current service application ID carried by the user terminal belongs to the service application ID list supported by a target UPF element; and an accessing sub-module located in the SMF element and configured to access the user terminal to the target UPF element.

Preferably, the resource acquisition request includes a network slice identification S-NSSAI, an access technology type being used by a UE, the service application ID, and UE location information.

Preferably, the UPF address includes an IP address and a tunnel identification of the target UPF element.

In order to solve the above problem, the embodiments of the disclosure disclose a computer program, which includes a computer readable code that, when executed on an electronic device, causes the electronic device to perform the above method.

In order to solve the above problem, the embodiments of the disclosure further disclose a computer readable medium storing the above computer program.

The embodiments of the disclosure have the following advantages.

In a preferred embodiment of the disclosure, the SMF element judges whether the target RAN node is connected to the current UPF element; if not, the user terminal is determined to be moved out of the current UPF service area; the SMF element sends the resource acquisition request to the NRF; the resource response message includes the UPF list; the UPF list includes the UPF address, and the service application ID list supported by the UPF element; the SMF element receives the resource response message fed back by the NRF; the SMF element judges whether the current service application ID carried by the user terminal belongs to the service application ID list supported by the UPF element; and if yes, the user terminal is accessed to the target UPF element. In this way, the SMF element matches the service application ID of the UE with the service application ID list supported by the target UPF element when selecting the UPF element by configuring the service application ID list supported by each UPF element in the NRF, so as to select the UPF element more accurately, ensure a continuity of service, and overcome the inaccuracy in selecting the UPF element using the parameters such as the DNN in a current 5G

DETAILED DESCRIPTION OF THE EMBODIMENTS

In order to make the above objects, features and advantages of the disclosure be more clearly understood, the disclosure will be described in further detail below with reference to the drawings and detailed description.

Figure 1:
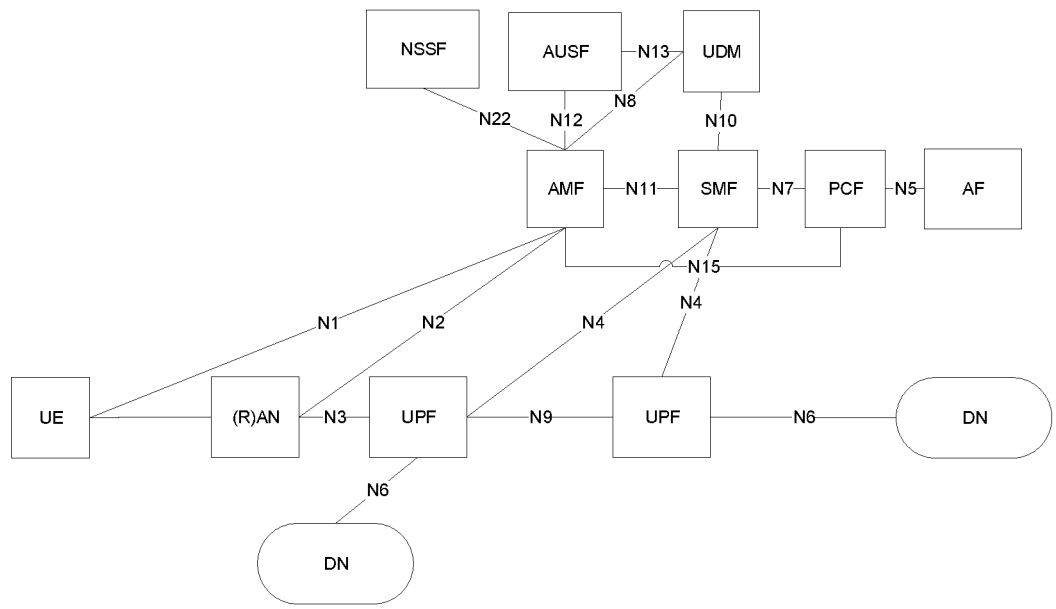
FIG. 1 is a first diagram illustrating an existing 5G system architecture.
Figure 2:
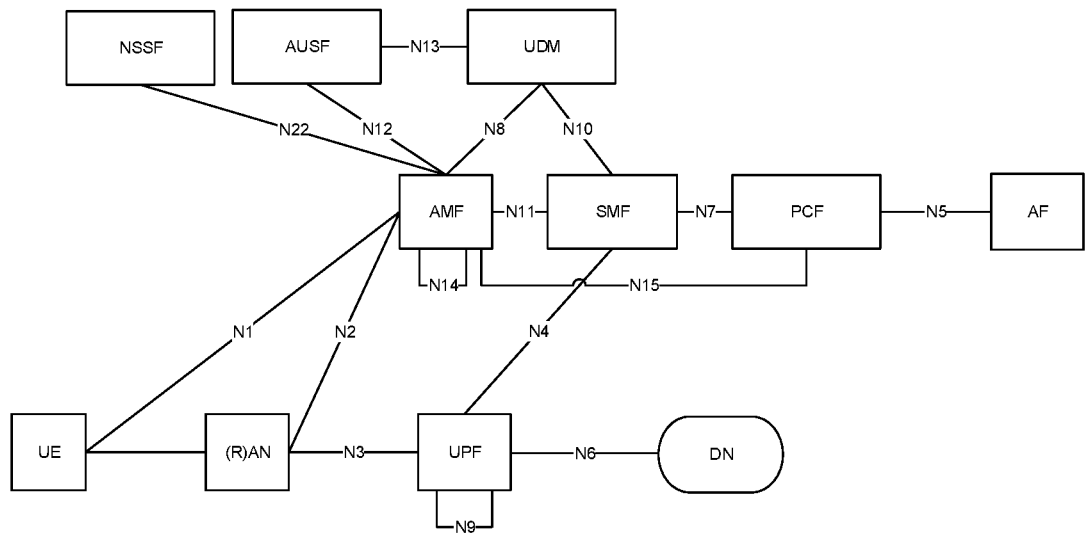
FIG. 2 is a second diagram illustrating the existing 5G system architecture.
Figure 3:
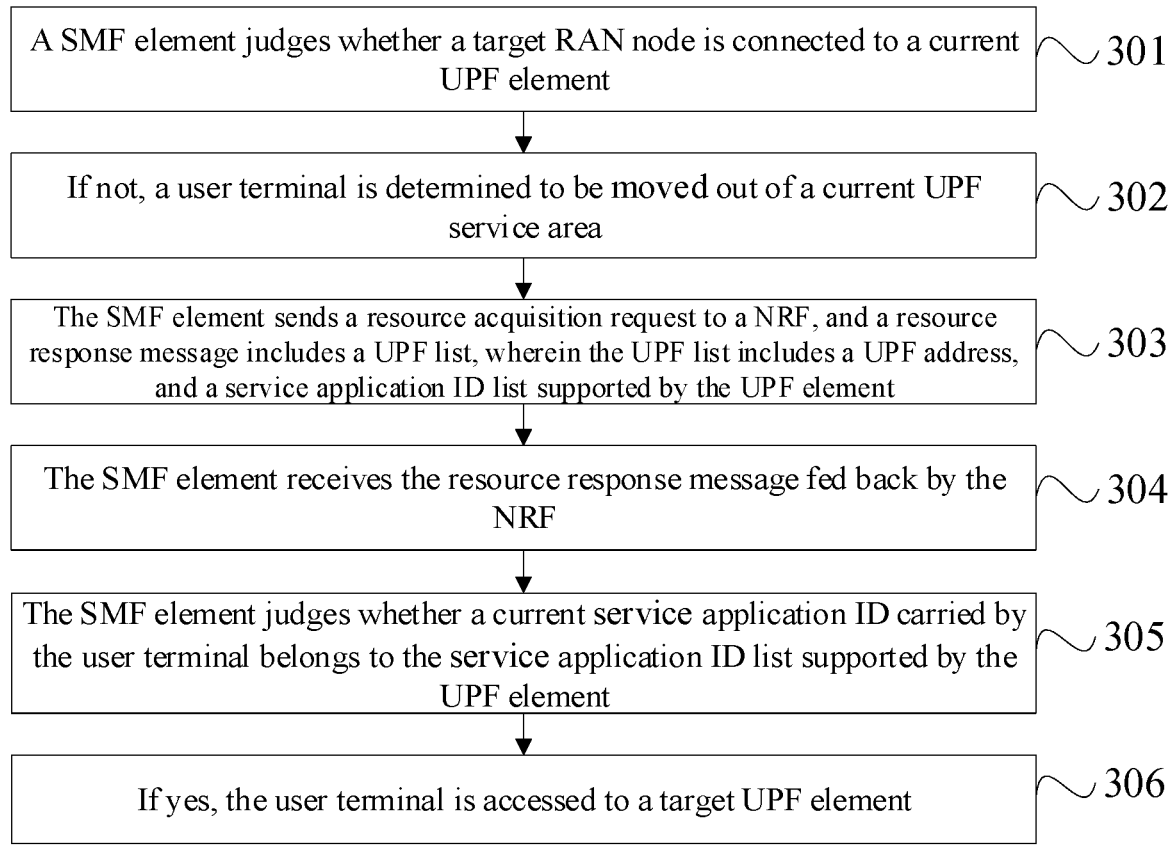
FIG. 3 is a flow chart illustrating steps of a UPF element selection method embodiment according to the disclosure.

Please refer to FIG. 3, which shows a flow chart of steps of a UPF element selection method embodiment according to the disclosure, which may specifically include the following steps.

In step 301, a SMF element judges whether a target RAN node is connected to a current UPF element.

A UPF element serving a PDU session of a UE is not changed in an area covered by a RAN node connected to a UPF element, and this area is called a UPF service area. The UPF service area is composed of one or more tracking areas, and a UPF element selection function is executed by the SMF element. When the UE crosses different UPF service areas during moving, the SMF element needs to reselect a UPF element for the UE.

In the embodiment of the disclosure, a user terminal carries UE location information, and the UE location information includes the tracking area.

In step 302, if not, the user terminal is determined to be moved out of a current UPF element service area.

Specifically, when Xn shifting or N2 shifting occurs during the movement of the UE, an AMF connected to the SMF element notifies the SMF element of the UE location information corresponding to the target RAN node. The SMF element judges whether the target RAN node is connected to the current UPF element, which means that the tracking area where the target RAN node is located is in a tracking area list corresponding to the UPF service area; if not, the current UPF element is determined to be unable to continue serving the UE, and a new target UPF element needs to be selected.

In the embodiment of the disclosure, a supported service application ID list is stored in the UPF element.

Specifically, each UPF element is stored with a service application ID list supported thereby, and the service application ID is equivalent to a service identification, which is used for distinguishing service capabilities of all UPF elements. In the prior art, none is stored with the service application ID list supported thereby. For example, a service application ID list of a certain UPF element includes an Internet of Vehicles service (service application ID) and an industrial control service (service application ID), then service applications supported by the UPF element are the Internet of Vehicles service and the industrial control service.

In step 303, the SMF element sends a resource acquisition request to a NRF, a resource response message including a UPF list, wherein the UPF list includes a UPF address, and a service application ID list supported by the UPF element.

In order to maintain a service application continuity of the UE, the SMF element needs to initiate a query process to the NRF, so as to select the target UPF element to continue serving a current service of the UE. The service application ID list supported by each UPF service area may be stored in the NRF for unified management, so that the SMF element may acquire the service application ID list supported by each UPF service area via querying the NRF.

Specifically, the resource acquisition request sent by the SMF element to the NRF may additionally carry the service application ID and the UE location information, wherein the service application ID is the service application ID of the UE being served by the UPF element.

In step 304, the SMF element receives the resource response message fed back by the NRF.

After receiving the resource acquisition request sent by the SMF element, the NRF finds out the UPF list containing the service application ID and the UE location information according to the service application ID and the UE location information, generates the resource response message, and then returns the resource response message to the SMF element.

In a preferred implementation of the disclosure, the UPF list in the resource response message includes the UPF address, and the service application ID list supported by the UPF element. The UPF address includes an IP address and a tunnel identification of the UPF element.

Specifically, the UPF address includes the IP address and the tunnel identification, wherein the tunnel identification is used for establishing a communication channel with upstream and downstream nodes. The service application ID list supported by the UPF element is all service application IDs supported by the UPF element.

Certainly, the UPF list in the resource response message not only includes the UPF address, and the service application ID list supported by the UPF element, but also includes a UPF dynamic load, a UPF relative static capacity, UPF effective location information, a UPF capacity, a data network name DNN, a PDN (Public Data Network) session type, a service continuity mode, UE subscription information, a data network access point identification DNAI, a local operator strategy, a network slice identification S-NSSAI, an access technology type being used by a UE, and other relevant parameter values.

In step 305, the SMF element judges whether a current service application ID carried by the user terminal belongs to the service application ID list supported by the UPF element.

After receiving the resource response message returned by the NRF, the SMF element can select one target UPF element.

In the embodiment of the disclosure, the user terminal also carries the current service application ID.

In step 306, if yes, the target UPF element is selected to serve the UE.

Specifically, the SMF element may firstly acquire the service application ID of the currently served UE from a session context, and then match the current service application ID with the service application ID list supported by the target UPF element. If a matched item exists, the current service application ID of the UE supported by the target UPF element may be determined, thus selecting the target UPF element to serve the UE. For example, the service application ID list supported by the target UPF element includes the Internet of Vehicles service and the industrial control service. If the UE currently uses the Internet of Vehicles service, then the matched item exists between the current service application ID of the UE and the service application ID list supported by the target UPF element.

In a preferred embodiment of the disclosure, the SMF element judges whether the target RAN node is connected to the current UPF element; if not, the user terminal is determined to be moved out of the current UPF service area; the SMF element sends the resource acquisition request to the NRF; the resource response message includes the UPF list; the UPF list includes the UPF address, and the service application ID list supported by the UPF element; the SMF element receives the resource response message fed back by the NRF; the SMF element judges whether the current service application ID carried by the user terminal belongs to the service application ID list supported by the UPF element; and if yes, the user terminal is accessed to the target UPF element. In this way, the SMF element matches the service application ID of the UE with the service application ID list supported by the target UPF element when selecting the UPF element by configuring the service application ID list supported by each UPF element in the NRF, so as to select the UPF element more accurately, ensure a continuity of service, and overcome the inaccuracy in selecting the UPF element using the parameters such as the DNN in a current 5G.

It should be noted that, for the sake of simple description, the method embodiments are all expressed as a series of action combinations, but those skilled in the art should understand that the embodiments of the disclosure are not limited by the described action sequences, because certain steps may be performed in other sequences or concurrently according to the embodiments of the disclosure. Secondly, those skilled in the art should also understand that the embodiments described in the specification are all preferred embodiments, and not all the actions involved are necessarily required by the embodiments of the disclosure.

Figure 4:
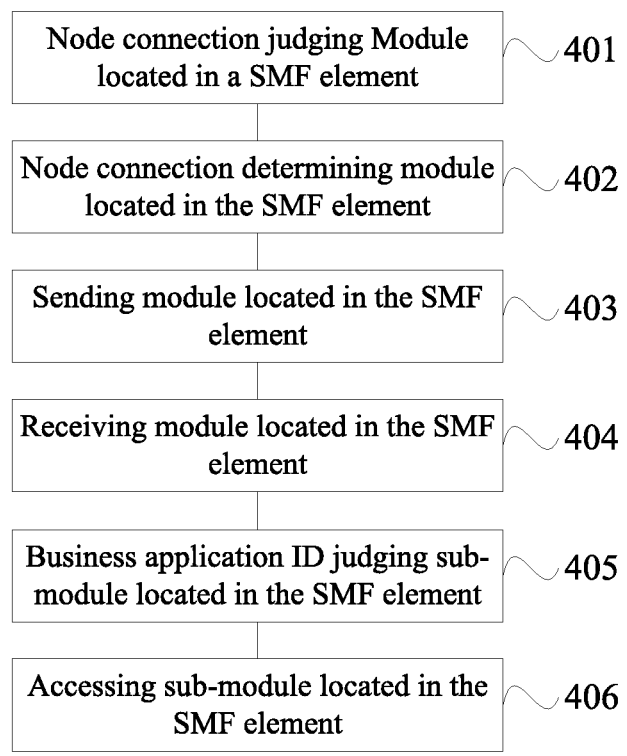
FIG. 4 is a structural block diagram of a UPF element selection device embodiment according to the disclosure.

Please refer to FIG. 4, which shows a structural block diagram of a UPF element selection device embodiment according to the disclosure, which may specifically include the following modules:

a node connection judging module 401 located in a SMF element and configured to judge whether a target RAN node is connected to a current UPF element;

a node connection determining module 402 located in the SMF element and configured to determine that a user terminal is moved out of a current UPF service area;

a sending module 403 located in the SMF element and configured to send a resource acquisition request to a NRF, a resource response message including a UPF list, wherein the UPF list includes a UPF address, and a service application ID list supported by the UPF element;

a receiving module 404 located in the SMF element and configured to receive the resource response message fed back by the NRF;

a service application ID judging sub-module 405 located in the SMF element and configured to judge whether a current service application ID carried by the user terminal belongs to the service application ID list supported by a target UPF element; and an accessing sub-module 406 located in the SMF element and configured to access the user terminal to the target UPF element.

In a preferred embodiment of the disclosure, the resource acquisition request includes a network slice identification S-NSSAI, an access technology type being used by a UE, the service application ID, and UE location information.

In a preferred embodiment of the disclosure, the UPF address includes an IP address and a tunnel identification of the target UPF element.

As for the device embodiment, since it is basically similar to the method embodiment, the description of the device embodiment is relatively simple. For relevant points, please refer to the partial description of the method embodiment.

Various member embodiments of the disclosure may be implemented in hardware, or in software modules running on one or more processors, or in a combination thereof. Those skilled in the art will appreciate that a microprocessor or a Digital Signal Processor (DSP) may be used in practice to implement some or all of the functions of some or all of the members in the server according to the embodiments of the disclosure. The disclosure may also be implemented as an apparatus or device program (e.g., a computer program and a computer program product) for performing some or all of the methods described herein. Such a program for implementing the disclosure may be stored on a computer readable medium or may have the form of one or more signals. Such signals can be downloaded from Internet websites, or provided on carrier signals, or provided in any other form.

Figure 5:
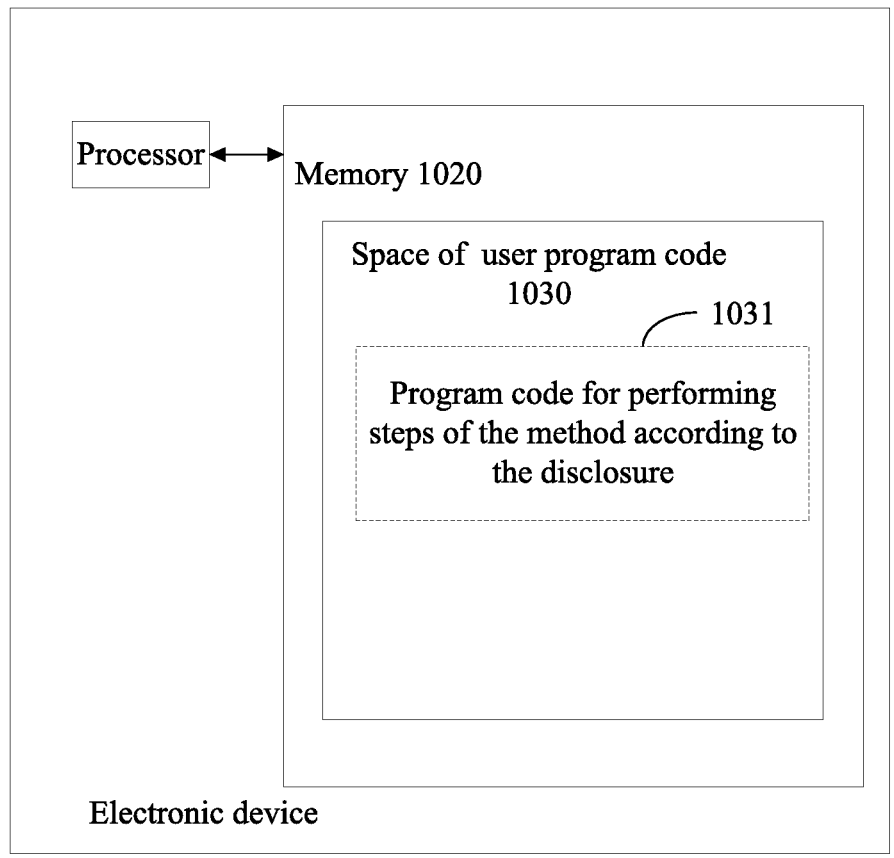
FIG. 5 shows a block diagram of an electronic device for performing the method according to the disclosure provided by the embodiments of the disclosure.
Figure 6:
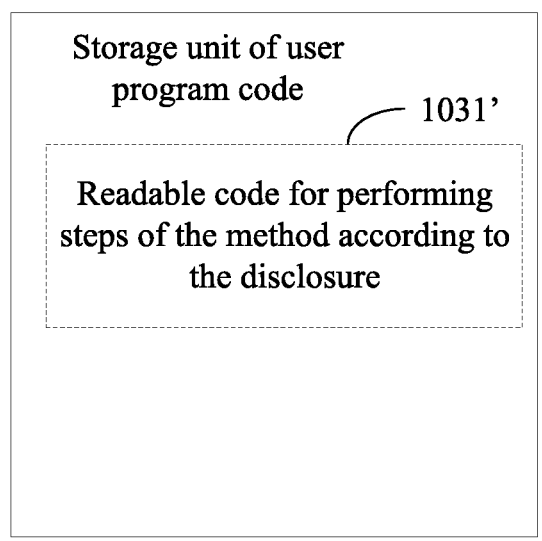
FIG. 6 shows a storage unit configured to hold or carry a program code performing the method according to the disclosure provided by the embodiments of the disclosure.

For example, FIG. 5 illustrates an electronic device capable of implementing the phase calibration method according to the disclosure, for example, a server. The electronic device conventionally includes a processor 1010 and a computer program product or computer readable medium in the form of a memory 1020. The memory 1020 may be an electronic memory such as a flash memory, an EEPROM (Electrically Erasable Programmable Read Only Memory), an EPROM, a hard disk, or a ROM. The memory 1020 has a storage space 1030 of a program code 1031 for performing any method step in the above described method. For example, the storage space 1030 for the program code may include respective program codes 1031 for respectively implementing various steps in the above described method. These program codes may be read from one or more computer program products or written to the one or more computer program products. These computer program products include program code carriers such as hard disks, compact disks (CD), memory cards, or floppy disks. Such a computer program product is typically a portable or fixed storage unit as described in FIG. 6. The storage unit may have storage segments, storage spaces, and the like arranged similarly to the memory 1020 in the electronic device of FIGS. The program code may be compressed in an appropriate form, for example. Generally, the storage unit includes computer readable codes 1031', i.e., codes readable by a processor such as 1010. These codes, when executed by the electronic device, caused the electronic device to execute various steps in the method described above.

The embodiments in the disclosure are all described step by step, the important part of each embodiment mainly lies in the difference between other embodiments, and the same or similar part between each embodiment may be referred to each other.

It should be appreciated by those skilled in this art that the embodiments of the disclosure may be provided as methods, device or computer program products. Therefore, the embodiments of the disclosure may take the form of complete hardware embodiments, complete software embodiments or software-hardware combined embodiments. Moreover, the embodiments of the disclosure may take the form of a computer program product embodied on one or more computer usable storage media (including but not limited to disk storage, CD-ROM, optical storage, etc.) in which computer usable program codes are included.

The disclosure is described with reference to the flow charts and/or block diagrams of the method, terminal device (system), and computer program products according to the embodiments of the disclosure. It should be appreciated that each flow and/or block in the flow charts and/or block diagrams, and combinations of the flows and/or blocks in the flow charts and/or block diagrams may be implemented by computer program instructions. These computer program instructions may be provided to a general purpose computer, a special purpose computer, an embedded processor, or a processor of other programmable data processing terminal device to produce a machine for the instructions executed by the computer or the processor of other programmable data processing terminal device to generate a device for implementing the functions specified in one or more flows of the flow chart and/or in one or more blocks of the block diagram.

These computer program instructions may also be provided to a computer readable memory that can guide the computer or other programmable data processing terminal device to work in a given manner, so that the instructions stored in the computer readable memory generate a product including an instruction device that implements the functions specified in one or more flows of the flow chart and/or in one or more blocks of the block diagram.

These computer program instructions may also be loaded to a computer, or other programmable terminal device, so that a series of operating steps are executed on the computer, or other programmable terminal device to produce processing implemented by the computer, so that the instructions executed in the computer or other programmable terminal device provide steps for implementing the functions specified in one or more flows of the flow chart and/or in one or more blocks of the block diagram.

Although the preferred embodiments of the disclosure have been described, those skilled in the art can make additional changes and modifications to these embodiments once they know the basic inventive concepts. Therefore, the appended claims are intended to be interpreted as including the preferred embodiments and all the changes and modifications that fall within the scope of the embodiments of the disclosure.

Finally, it should be also noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or terminal device including a plurality of elements includes not only those elements but also includes other elements not expressly listed, or also includes elements inherent to such a process, method, item, or terminal device. In the absence of further limitation, an element defined by the phrase "including a . . . " does not exclude the presence of additional identical element in the process, method, article, or terminal device.

The UPF element selection method and the UPF element selection device provided by the disclosure are described in detail above. Specific examples are applied to explain the principle and implementation of the disclosure herein. The above embodiments are only used to help understand the method of the disclosure and the core idea thereof. Meanwhile, for those of ordinary skills in the art, there will be changes in the specific implementation and application scope according to the idea of the disclosure. To sum up, the contents of this specification should not be construed as limiting the disclosure.

What is claimed is:

1. A User Plane Function element selection method, comprising:

judging, by a Session Management Function element, whether a target Radio Access Network node is connected to a current User Plane Function element;

when the target Radio Access Network node is not connected to the current User Plane Function element, determining that a user terminal is moved out of a current User Plane Function service area;

sending, by the Session Management Function element, a resource acquisition request to a Network Repository Function wherein the resource acquisition request comprises a User plane Function list wherein the User Plane Function list further comprises a User Plane Function address, a User Plane Function dynamic load, a User Plane Function relative static capacity, a service Application ID list supported by a User Plane Function element, a network slice identification S-NSSAI, an access technology type being used by a User Equipment, and User Equipment location information, wherein the service application ID list comprises a plurality of service application IDs such that each service application ID is equivalent to a service identification associated with a service capability of the User Plane Function element wherein such service identifications comprise at least one of an internet of vehicles service or an industrial control service;

finding, by the Network Repository Function, the User Plane Function list;

generating, by the Network Repository Function, a resource response message;

feeding back, by the Network Repository Function, the resource response message to the Session Management Function element wherein the resource response message comprises the User Plane Function list;

receiving, by the Session Management Function element, the resource response message fed back by the Network Repository Function;

judging, by the Session Management Function element, whether a current service application ID carried by the user terminal belongs to the service application ID list supported by the User Plane Function element;

when the current service application ID carried by the user terminal belongs to the service application ID list supported by the User Plane Function element, selecting, by the Session Management Function element, the User Plane Function element;

and accessing, by the Session Management Function element, the user terminal to the User Plane Function element.

2. The User Plane Function element selection method according to claim 1, wherein the User Plane Function address comprises an Internet Protocol address and a tunnel identification of the target User Plane Function element.

3. A system comprising:

a Session Management Function element;
   a Network Repository Function;
   a memory, wherein instructions are stored in the memory; and a processor, wherein the processor is configured to execute the instructions to perform operations for a User Plane Function element selection, and the operations comprise the following:

the Session Management Function element that judges whether a target Radio Access Network node is connected to a current User Plan Function and determines that, when the target Radio Access Network node is not connect to the current User Plane Function element, that a user terminal is moved out of a current User Plane Function service area;

the Session Management Function sends a resource acquisition request to the Network Repository Function wherein the resource acquisition request comprises a User plane Function list wherein the User Plane Function list further comprises a User Plane Function address, a User Plane Function dynamic load, a User Plane Function relative static capacity, a service Application ID list supported by a User Plane Function element, a network slice identification S-NSSAI, an access technology type being used by a User Equipment, and User Equipment location information, wherein the service application ID list comprises a plurality of service application IDs such that each service application ID is equivalent to a service identification associated with a service capability of the User Plane Function element wherein such service identifications comprise at least one of an internet of vehicles service or an industrial control service;

wherein the Network Repository Function finds the User Plane Function list;

wherein the Network Repository Function generates a resource response message;

wherein the Network Repository Function feeds back the resource response message to the Session Management Function element wherein the resource response message comprises the User Plan Function list;

wherein the Session Management Function element receives the resource response message fed back by the Network Repository Function;

wherein the Session Management Function element judges whether a current service application ID carried by the user terminal belongs to the service application ID list supported by the User Plane Function element;

wherein, when the current service application ID carried by the user terminal belongs to the service application ID list supported by the User Plane Function element, the Session Management Function elements selects the User Plane Function element;

and the Session Management Function element accesses the user terminal to the User Plane Function element.

4. The system according to claim 3, wherein the User Plane Function address comprises an Internet Protocol address and a tunnel identification of the target User Plane Function element.

5. A non-transitory computer readable medium, wherein computer programs are stored in the non-transitory computer readable medium, and the computer programs are configured to be executed by one or more processors of an electronic device to cause the electronic device to perform operations for a User Plane Function element selection, and the operations comprises the following steps:

judging, by a Session Management Function element, whether a target Radio Access Network node is connected to a current User Plane Function element;

when the target Radio Access Network node is not connected to the current User Plane Function element, determining that a user terminal is moved out of a current User Plane Function service area;

sending, by the Session Management Function element, a resource acquisition request to a Network Repository Function wherein the resource acquisition request comprises a User plane Function list wherein the User Plane Function list further comprises a User Plane Function address, a User Plane Function dynamic load, a User Plane Function relative static capacity, a service Application ID list supported by a User Plane Function element, a network slice identification S-NSSAI, an access technology type being used by a User Equipment, and User Equipment location information, wherein the service application ID list comprises a plurality of service application IDs such that each service application ID is equivalent to a service identification associated with a service capability of the User Plane Function element wherein such service identifications comprise at least one of an internet of vehicles service or an industrial control service;

finding, by the Network Repository Function, the User Plane Function list;

generating, by the Network Repository Function, a resource response message;

feeding back, by the Network Repository Function, the resource response message to the Session Management Function element wherein the resource response message comprises the User Plane Function list;

receiving, by the Session Management Function element, the resource response message fed back by the Network Repository Function;

judging, by the Session Management Function element, whether a current service application ID carried by the user terminal belongs to the service application ID list supported by the User Plane Function element;

when the current service application ID carried by the user terminal belongs to the service application ID list supported by the User Plane Function element, selecting, by the Session Management Function element, the User Plane Function element; and, accessing, by the Session Management Function element, the user terminal to the User Plane Function element.

6. The system according to claim 3, wherein the electronic device is a Session Management Function element.

7. The non-transitory computer readable medium according to claim 5, wherein the User Plane Function address comprises an Internet Protocol address and a tunnel identification of the target User Plane Function element.

* * * * *